(12) United States Patent
Kaufhold et al.

(10) Patent No.: US 7,670,653 B2
(45) Date of Patent: Mar. 2, 2010

(54) COATING METHOD FOR AN END WINDING OF AN ELECTRIC MACHINE

(75) Inventors: Martin Kaufhold, Nürnberg (DE); Bernhard Klaussner, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/911,593

(22) PCT Filed: Apr. 7, 2006

(86) PCT No.: PCT/EP2006/061461

§ 371 (c)(1),
(2), (4) Date: Oct. 15, 2007

(87) PCT Pub. No.: WO2006/108817

PCT Pub. Date: Oct. 19, 2006

(65) Prior Publication Data

US 2008/0152786 A1 Jun. 26, 2008

(30) Foreign Application Priority Data

Apr. 13, 2005 (DE) .................... 10 2005 017 111

(51) Int. Cl.
*B05D 1/04* (2006.01)
(52) U.S. Cl. .................... 427/470; 427/475; 427/117

(58) Field of Classification Search ................. 427/470, 427/475, 117
See application file for complete search history.

(56) References Cited

U.S. PATENT DOCUMENTS

| 3,937,180 | A |   | 2/1976 | Wiggins |
| 4,343,828 | A |   | 8/1982 | Smead et al. |
| 5,316,801 | A | * | 5/1994 | Hopeck .................... 427/486 |
| 5,922,413 | A | * | 7/1999 | Takeda .................... 427/470 |
| 2003/0113441 | A1 |   | 6/2003 | Baumann et al. |

FOREIGN PATENT DOCUMENTS

| WO | WO 97/07585 |   | 2/1997 |
| WO | 01/82449 | * | 11/2001 |
| WO | WO 01/82449 |   | 11/2001 |

\* cited by examiner

*Primary Examiner*—Frederick J Parker
(74) *Attorney, Agent, or Firm*—Henry M. Feiereisen; Ursula B. Day

(57) ABSTRACT

The coating method is for application to the coating of an end winding (3) of an electric motor (4), whereby the end winding (3) comprises several conductor arrangements (2) for coating. The coating material for application is atomized by means of a spray device (1). An electrostatic potential difference (U) is applied between the spray device (1) and the conductor arrangements (2) for spraying, such that atomized particles of the coating material are transported along the forming electrical field lines in the direction of the conductor arrangements (2) of the end windings (3) for coating.

5 Claims, 2 Drawing Sheets

COATING METHOD FOR AN END WINDING OF AN ELECTRIC MACHINE

BACKGROUND OF THE INVENTION

The invention relates to a coating method for an end winding of an electric machine, wherein the end winding comprises several conductor arrangements to be coated.

Coatings of different types and for different purposes are provided on the end winding of an electric machine, designed for example as an electrodynamic motor or generator. For example, they serve to provide electrical insulation, mechanical protection or chemical protection, and are produced by means of multiple impregnation with impregnating resins and impregnating varnishes or by casting with inorganically filled impregnating resins (=cast resin). Immersion methods or airless spray methods, for example, are used for this purpose. Because of the sometimes complex geometry of the end winding, a layer produced using one of these known end winding coating methods does not have a uniform coating thickness throughout. Only lower coating thicknesses often result, particularly in the area of edges, points, clefts, undercuts or shaded areas.

SUMMARY OF THE INVENTION

The object of the invention therefore consists in specifying a coating method of the kind described in the introduction with which a more uniform layer thickness of the end winding coating can be achieved.

This object is achieved in accordance with the invention by a coating method in which
a) the layer material to be applied is atomized by means of a spray device, and
b) an electrostatic potential difference is applied between the spray device and the conductor arrangements to be coated,
c) such that atomized particles of the layer material are transported along the electric field lines, which form in the direction of the conductor arrangements of the end winding to be coated.

Very homogeneous layer thicknesses can be achieved with the coating method according to the invention, even in the case of complex end winding geometry. This also particularly applies to the problematic areas mentioned above. An increased field line density is present particularly at edges and points, which, inherently to the method, results in a higher transport rate of the atomized particles of the layer material, and the development of too low a layer thickness is counteracted virtually automatically. Shaded or undercut areas are also affected by the electric field lines so that an adequate layer thickness is achieved even here. No uncoated and therefore unprotected areas remain, even in these critical zones of the end winding. Furthermore, large layer thickness differences, such as are found with the known methods, are avoided.

Particularly when applying an electrically insulating layer material, a kind of self-regulation occurs as the coating proceeds. An ever increasing electrical counter field is set up as the thickness of the applied material increases, as the charges are able to flow away less and less well or even not at all as a result of the growing insulating layer. This is beneficial, as electrically insulating layer materials are used almost exclusively, particularly when coating an end winding.

The reason for using electrically insulating layer materials lies in the electrically active conductor arrangements to be coated, which carry current and are live during the operation of the electric machine.

The coating method according to the invention is therefore used for coating electrically active parts. In contrast with this, the previously known electrostatic spray methods have always been used for coating electrically non-active parts.

Furthermore, the coating method according to the invention is also very sparing on material consumption due to the field-line-controlled and therefore very accurate material feed as well as the described self-regulation. Compared with the conventional immersion methods or airless spray methods, this results in a reduction of the required layer material by about 30%.

Advantageous embodiments of the coating method according to the invention can be seen from the characteristics of the claims dependent on claim 1.

There is both a first variant, in which the spray device is connected to a high electrostatic potential, in particular lying in the kV range, and a second variant, in which the conductor arrangements of the end winding to be coated are connected to a high electrostatic potential. In the first variant, the end winding including its conductor arrangements are connected particularly to ground. In the second variant, a ground connection is particularly made to the spray device. In both cases, the particles are transported beneficially along the electric field lines.

Furthermore, a laminated core, which is part of a stator or a rotor of the electric machine for example, can also be connected to a high electrostatic potential. The conductor arrangements are laid in slots of the laminated core, in particular electrically insulated with respect to the laminated core, and are fed out of the laminated core at two face surfaces. The conductor arrangements, which are fed out here, form an end winding at each face end. Electrical contact can easily be made to the laminated core, which in particular is made from electrically conducting iron sheets, and the laminated core can therefore easily be connected to the high electrical potential. Once again there is a beneficial path of the electric field lines from the spray device to the conductor arrangements of the end winding to be coated.

In a further embodiment, the conductor arrangements of the end winding are coated with a layer material made from impregnating resin, insulating varnish or silicone rubber. These materials serve to provide mechanical or chemical protection or protection against moisture or saline mist, or electrical insulation. At the same time, depending on the application, the silicone rubber can also be in the form of a gel-like extensively self-healing polymer material. In particular, it is a silicone gel with a very good adhesive capability and a particularly high elasticity, accordingly with a very low modulus of elasticity (=Young's modulus).

Preferably, in addition, a layer thickness of a coating to be applied to the conductor arrangements of the end winding is set by means of the value of the electrostatic potential difference, that is to say the electric field strength. In this way, layer thicknesses between 0.1 mm and 1 mm can be realized without any problems, a layer thickness in the range of 0.1 mm being used rather for a moisture-repellent coating, and a layer thickness in the range of 1 mm being used rather for a coating intended as the main electrical insulation.

BRIEF DESCRIPTION OF THE DRAWING

Further characteristics, advantages and details of the invention can be seen from the following description of exemplary embodiments with reference to the drawing. In the drawing.

DETAILED DESCRIPTION OF PREFERRED EMBODIMENTS

Corresponding parts are given the same references in FIGS. 1 to 5.

Figure 1:
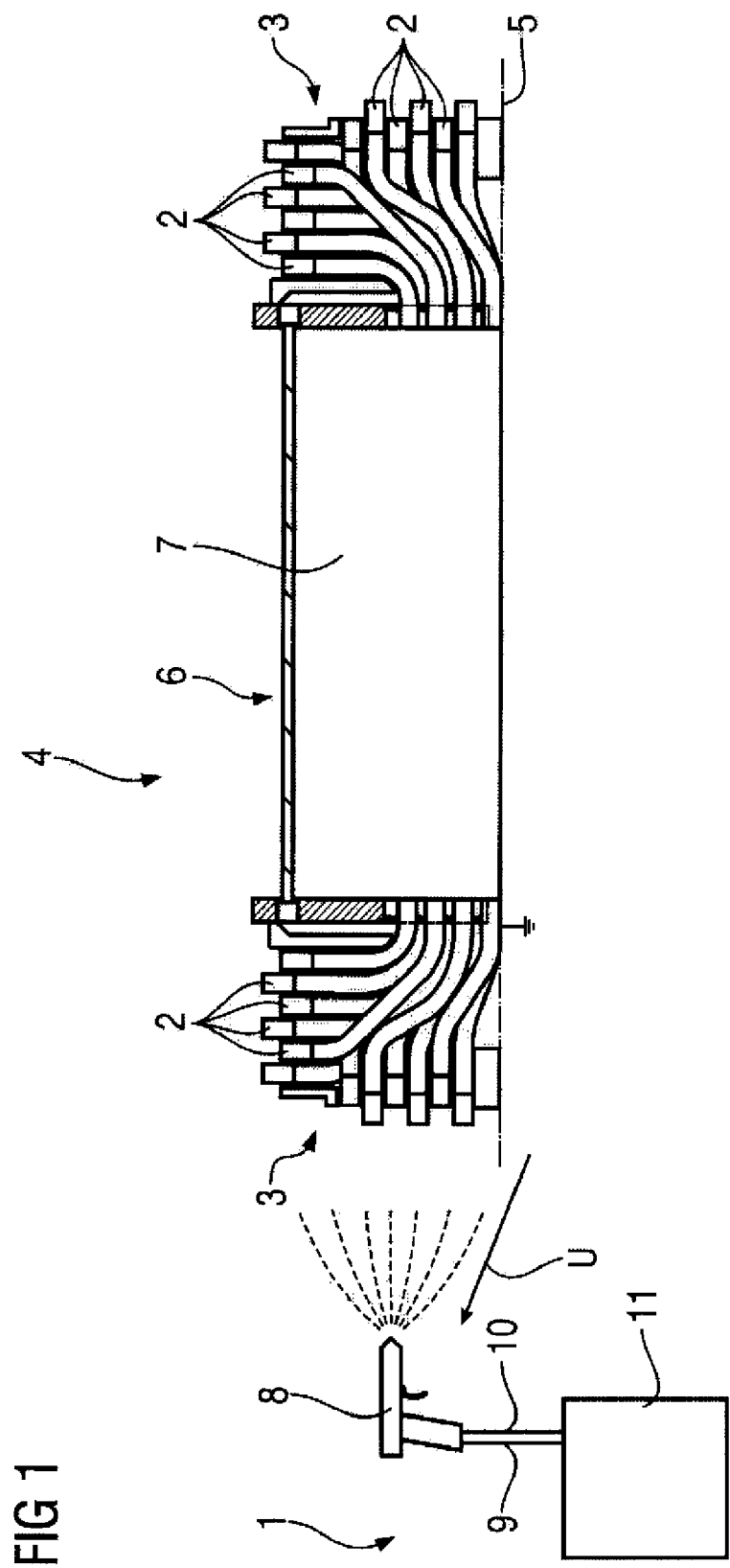
FIG. 1 shows an exemplary embodiment of a spray device for the electrostatic coating of an end winding of an electric machine formed from several conductor arrangements.

FIG. 1 shows an exemplary embodiment of a spray device 1 for the electrostatic coating of two end windings 3 of an electric machine 4, which is shown in partial cross section, wherein said windings are formed from several conductor arrangements 2.

The section through the electric machine 4 runs along an axis of rotation 5 through a stator 6 of the electric machine 4 and shows only part of the top half of the stator 6. An actually active area 7 with the iron laminations of the stator and the electric coil conductors guided in slots is not shown in detail but only schematically. The end windings 3 are arranged on both axial face ends of the active area 7. They are formed by a large number of electrical conductor arrangements 2, which are fed out of the iron laminations of the stator in the direction of the axis of rotation 5. The end windings 3 and in particular the conductor arrangements 2, which run in the area of the end windings 3, are protectively coated by means of the spray device 1.

The spray device 1 comprises a spray gun 8, which is connected to a main unit 11 by means of a material feed line 9 and an electrical feed line 10. Components such as a material storage container and an electrical high-voltage source, which are not shown in detail, are accommodated in the main unit 11.

The spray device 1 works on the electrostatic spray method principle. Here, a high electrical voltage U is applied between the output nozzle of the spray gun 8 and the object to be coated, that is to say in the exemplary embodiment the conductor arrangements 2 of the end winding 3. The layer material to be applied is atomized at the nozzle and in particular sprayed or squirted in the direction of the conductor arrangements 2, whereby the thus atomized electrically charged material particles move along the electric field lines toward the conductor arrangements 2 to be coated.

In the exemplary embodiment, the output nozzle of the spray gun 8 is at a high electrostatic potential of several kV, whereas the conductor arrangements 2 are connected to ground potential. However, in principle, these electrical potential connections can also be reversed.

The electrostatic spray method used enables the electrically active conductor arrangements 2 of the end windings 3 to be coated very uniformly. A good coating also results in problematic zones where only a reduced material coating or even none at all is achieved with other coating methods.

Figure 2:
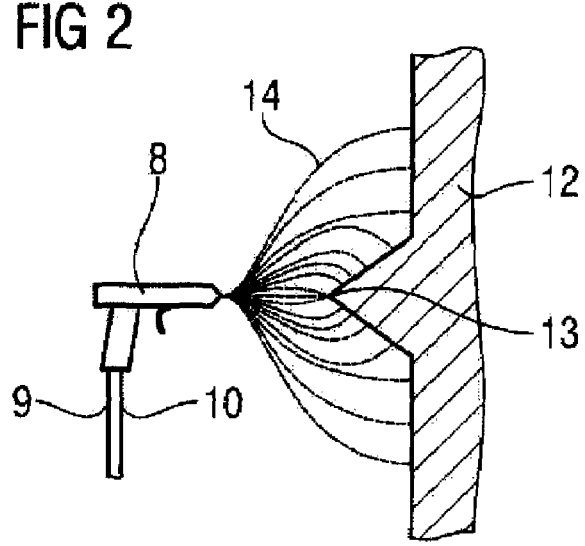
FIG. 2 shows the path of the electric field lines between the spray device according to FIG. 1 and a protruding edge of an object to be coated.
Figure 3:
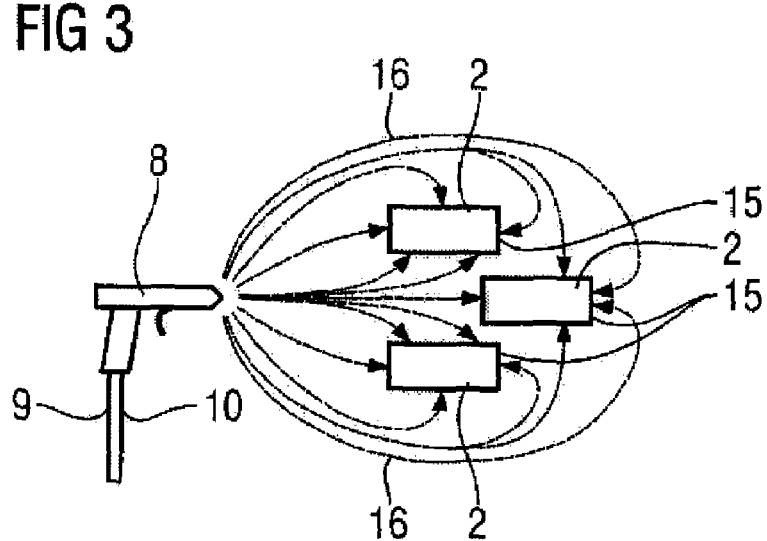
FIG. 3 shows the path of the electric field lines between the spray device according to FIG. 1 and several conductor arrangements according to FIG. 1 with partial shading.
Figure 4:
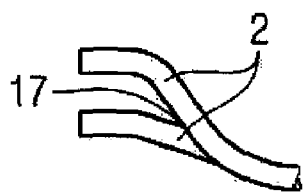
FIG. 4 shows a cleft between two conductor arrangements according to FIG. 1.

Examples of such problematic zones are shown in FIGS. 2 to 4. An object 12 with a protruding edge 13 to be coated is shown in FIG. 2. Electric field lines 14, which form between the output nozzle of the spray gun 8 and the object 12, are also shown. A higher field line density is produced in the area of the edge 13 so that material is also transported to this point at a higher rate. A sufficiently thick coating is therefore also applied to the edge 13.

According to the illustration in FIG. 3, the conductor arrangements 2 can be placed next to one another in such a way that parts of the surfaces to be coated are shaded with respect to the spray gun 8 and are therefore barely or not at all accessible for conventional coating methods. These shadings or undercuts are shown by 15 in FIG. 3. With the electrostatic spray method, they are also affected by electric field lines 16 and consequently also coated.

According to the illustration of FIG. 4, two adjacent conductor arrangements 2 can be fed so that they form a cleft 17, which is also difficult to access for conventional coating methods. This critical area can also be coated by means of the electrostatic spray method.

Figure 5:
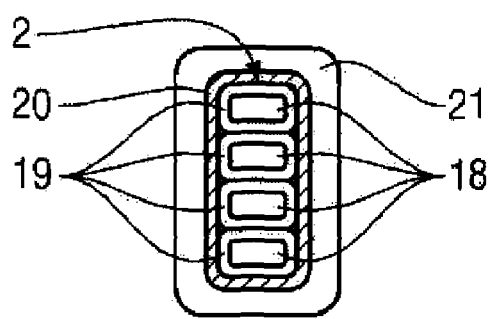
FIG. 5 shows a cross section through a coated conductor arrangement according to FIG. 1.

From the cross-section through one of the coated conductor arrangements 2 shown in FIG. 5, it can be seen that, in the exemplary embodiment, the conductor arrangements 2 used for the coil windings are made up of several partial conductors 18, which are electrically insulated with respect to one another. The partial conductors 18 consist of copper bars. Each partial conductor 18 is enclosed by a partial conductor insulation 19 made of a Kapton film.

In the exemplary embodiment, the coating produced by means of the electrostatic spray method has two layers. It includes an inner first covering layer 20 and an outer second covering layer 21. The first covering layer 20, which is applied directly to the conductor arrangement 2, consists of a silicone gel, and the second covering layer 21 consists of a cast resin. However, in principle, a rubber-elastic silicone rubber can also be provided in place of the cast resin. Thanks to the particularly beneficial electrostatic spray method used for production, the two covering layers 20 and 21 each have a layer thickness, which is practically uniform overall. The two covering layers 20 and 21 also carry out the function of the main electrical insulation so that an additional intermediate insulation layer can be dispensed with. This simplifies the construction, and the manufacturing costs are reduced. The intermediate insulation layer, which is otherwise provided, consists of winding the conductor arrangements 2 with mica tape. This winding is laborious, particularly in the area of the end windings 3, and can often only be carried out by hand. In contrast, an electrostatic spray method can be carried out without any problems in an automated manner.

What is claimed is:

1. A coating method for an end winding of an electric machine, comprising the steps of:
    providing a laminated core of an electric machine with slots containing a conductor arrangement which is fed out of the laminated core at an end surface thereof to form an end winding;
    providing an electrostatic spray device;
    applying an electrostatic potential to the laminated core of the electric machine to thereby establish an electrostatic potential difference between the spray device and the conductor arrangement;
    applying a first layer material directly onto the conductor arrangement to form a first coating with the spray device such that atomized particles of the first layer material are transported along electric field lines which are generated as a result of the electrostatic potential difference; and
    applying a second layer material that differs from the first layer material all-round onto the first coating with the spray device such that atomized particles of the second layer material are transported along electric field lines which are generated as a result of the electrostatic potential difference.

2. The coating method of claim 1, further comprising the step of adjusting a layer thickness of the first and second coatings in dependence on a value of the electrostatic potential difference.

3. The coating method of claim 1, wherein the first layer material is silicone gel.

4. The coating method of claim 1, wherein the second layer material is cast resin.

5. The coating method of claim 1, wherein the second layer material is a rubber-elastic silicone rubber.

* * * * *